United States Patent Office 3,384,659
Patented May 21, 1968

3,384,659
CATALYTIC DECOMPOSITION OF FORMIC
ACID IN ACETIC ACID MIXTURES
Roger A. Bate, Pampa, Tex., assignor to Celanese Corporation of America, New York, N.Y., a corporation of Delaware
No Drawing. Filed Apr. 6, 1964, Ser. No. 357,814
16 Claims. (Cl. 260—541)

This invention relates broadly to the treatment of mixtures of different compounds to remove (partly or substantially completely) an undesired component of the mixture. More particularly, the invention is concerned with the selective removal of formic acid (HFo), by catalytic decomposition, from admixtures with other compounds including acetic acid (HAc). The scope of the invention also includes the catalyst employed in practicing the method features of the invention.

In many chemical processes HFo is often unavoidably formed as an admixture with other volatilizable organic compounds including acetic acid. Water also may be a component of such admixtures. Thus, in certain methods of producing acetic acid that involve hydrocarbon-oxidation technique, the product comprises, for example, an aqueous solution of acetic acid containing a substantial proportion of other organic compounds including HFo, methyl formate, ethyl acetate, methanol, acetone, methyl ethyl ketone and acetaldehyde. Mixtures containing HFo admixed with oxygen-containing organic components such as acetic acid also are obtained in certain processes of oxidizing alkylbenzenes with molecular oxygen to phthalic acids [e.g., isophthalic acid from meta-(diisopropyl)benzene and terephthalic acid from para-(diisopropyl)benzene] and wherein the oxidation is effected in the presence of acetic acid as a solvent.

In chemical processes such as those described briefly above it is usually either necessary or desirable to remove at least part of the HFo from mixtures containing formic and acetic acids and/or other components. For example, selective removal of HFo is necessary when it is desired to recycle acetic acid, or other organic compound or compounds admixed therewith, back to the reaction zone in such form that it is free from any substantial amount of HFo. In other cases the removal of HFo must be effected in order to recover, in substantially pure state, the organic compound(s) with which the HFo is admixed. Removal of HFo from feed streams to an acetic anhydride furnace that contain both formic and acetic acids is also desirable in order to minimize the amount of decomposition gas in the furnace. In addition, the strongly corrosive properties of HFo make it desirable to remove it from chemical-process areas in order to avoid serious corrosion damage to processing equipment or the necessity for using costly corrosion-resistant alloys as construction materials.

Prior techniques used or suggested for removing HFo from admixtures with acetic acid and other compounds, such as those mentioned or indicated above, have included pyrolysis, azeotropic-distillation methods, solvent-extraction procedures or the use of formic acid-decomposition catalysts as in, for example, U.S. Patent No. 2,656,379, MacKenzie et al., which is assigned to the same assignee as the present invention. Pyrolysis techniques generally lead to the diminution of production of the desired product after the HFo has been pyrolyzed in admixture with the other organic component(s) of the admixture. Azeotropic distillations of admixtures containing both formic and acetic acids in order to separate the HFo have the disadvantage of resulting in an appreciable loss of acetic acid along with HFo. Solvent-extraction techniques have this same disadvantage.

The present invention involves the use of a formic acid-decomposition catalyst, and provides an unobvious improvement over the patented invention of MacKenzie et al., supra, in that its use makes possible the removal of the formic acid at a lower temperature or with a higher percentage removal of HFo at the same temperature than with the catalyst employed by MacKenzie et al., and with the obvious benefits flowing therefrom that will be apparent to those skilled in the art.

One object of the present invention is to provide a method of selectively removing HFo from a mixture containing HFo and other vaporizable components including acetic acid, and wherein the HFo is present as an undesirable component or impurity.

Another object of the invention is to provide an efficient and economical process for the selective removal of HFo from a mixture containing formic and acetic acids by catalytic decomposition of the HFo component of the mixture. This mixture also may contain, for example, water; hydrocarbons, especially the lower-boiling aliphatic hydrocarbons and aromatic hydrocarbons; and other oxygen-containing organic compounds in addition to formic and acetic acids, numerous examples of which were given in the second paragraph of this specification.

Still another object of the invention is to provide a process as stated in the preceding paragraph but which is modified so that the useful life of the catalyst is prolonged.

A further object of the invention is to provide a new and useful catalyst and, more particularly, a formic acid-decomposition catalyst.

Other objects of the invention will be apparent to those skilled in the art as the description of the invention proceeds.

The foregoing and other objects are attained by bringing a vaporous mixture obtained by vaporizing a mixture containing HFo and other vaporizable organic compounds including acetic acid into contact with a particular kind of a catalyst, more particularly a formic acid-decomposition catalyst comprised of certain constituents. This catalyst comprises an adsorbent, preferably an inorganic adsorbent, e.g., an absorbent alumina- and/or a silica-containing material including adsorbent alumina, adsorbent silica, adsorbents comprising mixtures or other combinations (e.g., chemical combinations) of ingredients including alumina or silica in any proportions, and others. The alumina and/or silica is preferably activated alumina and/or activated silica, which are commercially available products. As between activated alumina and activated silica (also known as "silica gel" in at least some of its commercial forms), I prefer to use activated alumina.

The catalyst of this invention and which is used in practicing the method features thereof is characterized by the fact that it has on the surfaces (both inner and outer surfaces) of its adsorbent component, supra, "inherently acidic salt," by which term is meant a salt that hydrolyzes in water to give an acidic solution, i.e., pH <7.0. Such salts include those that are formed (or are capable of being formed) by neutralization of a weak base with a strong acid. The cation of the aforesaid salt may be varivalent. Thus, the inherently acidic salt may be a copper salt, specifically the cupric salt, of a strong acid such, for instance, as sulfuric, sulfurous, phosphoric, hydrochloric, dichloroacetic, trichloroacetic, etc.

Additional systems may be provided by salts, e.g., the copper salts, of strongly acidic ion-exchange resins.

In addition to copper, preferably in the $Cu^{++}$ form, other examples of metals that may constitute the cation of the inherently acidic salt include iron, cobalt, nickel, iridium, palladium and platinum.

Although the exact mechanism of the reaction is not known, the fact that $Cu^{++}$ is reduced to $Cu^0$ when no $O_2$ is fed in indicates that the mechanism is at least partly oxidation-reduction. Loss of catalytic activity when the cation is in the metallic form is further evidence that the cation does serve as an oxygen-transfer agent in an oxidation-reduction mechanism.

The amount of the aforesaid salt which is on the surfaces of the adsorbent (solid adsorbent) may be varied considerably depending, for example, upon the particular salt and adsorbent employed, the material (i.e., vaporous mixture) being treated with the catalyst, the particular equipment and operating conditions employed, and other influencing factors. Usually, however, the amount of the acidic salt on the surfaces of the adsorbent is at least about 0.05 weight percent, calculated on the basis of the cation component of the said salt, of the weight of the said adsorbent. More particularly, the amount of the acidic salt on the surfaces of the adsorbent may be, for instance, from about 0.1 weight percent to about 10 weight percent or more, e.g., about 0.2, 0.5, 1, 2 or 5% of the weight of the adsorbent, calculated on the basis of the cation component of the salt. The catalyst may be in any suitable form such as those conventionally employed in contacting a gas or vapor with a catalyst. For example, the catalyst may be in the form of beads, pellets, tablets or other regular, or fairly regular, shapes; or it may be in comminuted or finely divided irregular shapes such as those that result from crushing or grinding followed by screening to a particular average size or range of sizes. Such shaped or unshaped forms of the catalyst may have a mesh or screen size (U.S. Standard Sieve Series) ranging, for instance, from about 1 to 30 mesh, depending on the equipment in which it is to be used. The use of catalysts of regular or irregular shapes in a mesh size lower (i.e., or larger particle size) or higher (i.e., of smaller particle size) than those just mentioned by way of illustration is, of course, not precluded.

Any suitable method may be employed in preparing the catalysts of this invention. For example, they may be produced by adding a water solution of the aforementioned inherently acidic salts to an appropriate amount of the previously described solid adsorbent in a heated vessel. The water is removed by evaporation, with or without agitation, leaving the salt deposited on the inner and outer surfaces of the adsorbent. An alternative method of preparing the catalyst is to place the adsorbent in the catalyst chamber, and then recycle a water solution of the chosen salt through the adsorbent bed under heat until all of the water has been evaporated.

The vapors and the catalyst may be brought into contact with each other in any suitable manner, for instance, while the latter is in the form of a fixed bed or a moving bed; or a stream of the vapors and a fluid stream of the catalyst in very finely divided form (e.g., from 200/300 mesh, 300/400 mesh or finer) may be brought together in a fluid-catalyst type of reactor.

The formic acid-containing mixtures which are contacted in vapor form with the catalyst employed in practicing the method features of the invention may be mixtures such as those described hereinbefore, as well as others known in the art. In addition to HFo the mixtures may contain other components that undergo reaction while carrying out the method but with no adverse affect, if any, in selectively decomposing, and thus removing HFo from the mixture. The mixtures to be treated may be those having a wide range of HFo content, e.g., from 0.5% to 30 or 40% or more by weight of the mixture. Usually the HFo constitutes a minor amount (less than 50%) by weight of the mixture. Modifications in operation may be necessary when a relatively large amount of HFo is present in the admixture to be catalytically treated. The economic practicality of the treatment is the only limitation as to the lower HFo content of the mixture to be treated, e.g., it may contain an amount less than 0.5% HFo such as 0.4%, 0.2% or any lower measurable amount.

The method of the invention is practiced by vaporizing the formic acid-containing mixture and contacting the vapors with the catalyst of the invention. The catalyst chamber is heated by any suitable means to maintain the vapors sufficiently high to secure optimum efficiency, e.g., within a bed-temperature range of about 125° C. to about 250° C., and preferably within the range of 150° C. to 225° C. (A bed temperature corresponds approximately to the skin temperature plus 50°–65° C.) The HFo is selectively decomposed while the acetic acid and certain other organic compounds that may be present in the mixture pass through the catalytic zone substantially unchanged. With the new combination or composite catalyst, removal of 87 to 99.8 weight percent of HFo from mixtures containing formic and acetic acids has been obtained.

When the HFo-containing mixture is a liquid, it may be vaporized either prior to bringing it into contact with the catalyst; or, alternatively, it may be vaporized while concurrently effecting contact with the catalyst.

The time of contact of the vapors with the catalyst will vary considerably depending, for example, upon the composition of the particular catalyst and feed employed, the physical form or shape of the catalyst, the size of the catalytic zone, type of catalytic bed including the means employed for effecting contact between the vapors and the bed, and other influencing factors. Usually, however, the velocity of the vapors relative to the catalytic bed is adjusted so that the time of contact of the vapors with the catalyst is at least about 0.5 second and, more particularly, from about 0.5 second to about 60 seconds. When the mixture to be treated contains a relatively small amount of HFo, such as less than 5%, e.g., about 2 to 3%, good results have been obtained using a contact time of the order of 5 to 10 seconds.

The method features of this invention may be carried out under atmospheric, subatmospheric or superatmospheric pressures, or by any combinations thereof. The pressure employed may be varied considerably but is usually within the range of from atmospheric pressure to about 30 p.s.i.g. It is to be understood, of course, that the use of lower or higher pressures is within the scope of the invention, and that such lower or higher pressures may be employed as desired or as conditions may require.

The space velocity also may vary considerably depending, for example, upon the temperature and pressure employed, the size, shape and form of the catalytic reactor, the particular catalyst used (that is, from the standpoint of physical form; chemical constitution; total, i.e., internal and external, surface area; size and shape, or average particle size if in particulate form; and the like), how the catalyst and the vaporous mixture are brought into contact, and other influencing factors. Ordinarily, however, a space velocity corresponding to about 7.5 gals. or more of liquid feed per cubic foot of catalyst per hour is satisfactory for use; and, more particularly, a space velocity corresponding to from 7.5 to 12–15 gals./cu. ft./hr.

The lower value of 7.5 gals. of liquid feed is a practically useful value, but even minute quantities of liquid feed, such as ¾ gal. or less might be used if desired. Similarly, the upper limits for contact time and for feed rate of gaseous oxidizer are practically useful values, but could be much higher if desired.

A modification of the method of the present invention comprises means whereby the useful life of the catalyst is prolonged by continuous regeneration (or prevention of deterioration) in situ. It is based on my discovery that the usefulness of the catalyst can be materially extended by bringing a gaseous oxidizing agent, more particularly an oxygen-containing gas, and specifically air or oxygen itself, into contact with the catalyst concurrently with contacting the formic acid-containing mixture in vapor form with the catalyst. The air, oxygen or other gaseous oxidizing agent may be preheated, if desired, to the approximate temperature of the vaporous mixture if, otherwise, the said oxidizing agent is not quickly enough brought to the temperature of the catalytic bed. Such preheating also insures that excessive cooling of the vaporous mixture and/or of the catalyst will not occur upon coming into contact with cooler gaseous oxidizer. The feed rate of the air or other gaseous oxidizing agent to the catalytic zone is adjusted with respect to the quantity of vaporous mixture going to the said zone, which latter is dependent upon the rate of feed of the formic acid-containing liquid mixture going to the vaporization unit, so that optimum efficiency in relation to time is obtained from the catalyst. For example, the gaseous-oxidizer feed to the catalytic zone with respect to the feed of the said liquid mixture to the vaporization unit may be at a rate corresponding to from about 5 to 300, preferably from about 25 to about 75 ml. per minute of the former for each ml. per minute of the latter. More particularly, the ratio of the feed of the gaseous oxidizer to that of the liquid mixture containing HFo may range from 40 to 60, specifically about 50, ml. per minute of the former for each ml. per minute of the latter.

It may here be mentioned that the catalyst has a relatively short life without the introduction of a gaseous oxidizer, e.g., an air feed, and a very long life with it. Even with, for example, an air feed, a slow deterioration of the catalyst (as reflected by percent HFo decomposition) is observed. (Regeneration of the catalyst from this type of deterioration is accomplished by following the alternative method briefly described above for original catalyst preparation.) Apparently this degeneration is due to the very slow removal of metallic ion, e.g., $Cu^{++}$, from the surface of the catalyst.

Gaseous oxidizers that may be used to regenerate the catalyst in situ, in lieu of or in addition to air or oxygen, include, for example, gaseous oxides of nitrogen such as $NO_2$, $N_2O_4$, $NO$, etc.

In order that those skilled in the art may better understand how the present invention can be carried into effect, the following examples are given by way of illustration and not by way of limitation. All percentages are by weight.

Example 1

(A) Activated alumina (422.4 g. of Alcoa alumina, grade F-1, 8-14 mesh) is placed in an evaporating dish. Eight and three-tenths (8.3) g. of copper sulfate pentahydrate ($CuSO_4 \cdot 5H_2O$) is dissolved in water (e.g., about 100-200 ml., the amount is not critical), and this solution is poured into the evaporating dish. Most of the water is evaporated over a steam bath, with stirring, and the remainder is removed in a 350° F. oven. The resulting product is a pale blue material (catalyst) composed of alumina having on its internal and external surfaces about 0.5 wt. percent $Cu^{++}$ ion as $CuSo_4$.

(B) Same as in 1-A with the exception that 180 g. of Alcoa alumina, grade H-151, ⅛-inch diameter spheres, and 7.2 g. of $CuSO_4 \cdot 5H_2O$ are used. The resulting catalyst contains about 1 wt. percent $Cu^{++}$ ion as $CuSO_4$.

(C) Same as in 1-A and 1-B except that the water is evaporated from the solution of $CuSO_4$ in the reactor tube used in carrying out the process by circulating the solution while heating.

Example 2

The apparatus used in this example comprises a tube 24 inches long and ¾ inch inside diameter provided with a vaporizing pot at the bottom and a condenser at the other end. The entire tube, including the pot, is wrapped with resistance wire as a source of electrical heat. Alternatively, a pot equipped with a thermosiphon reboiler may be used as the vaporizer.

A catalyst (153 g.), prepared as described in Example 1-B, is packed into the glass tube. A formic acid-containing mixture is fed into the vaporizer. This mixture has the following approximate composition:

| | Wt. Percent |
|---|---|
| HAc | 97.11 |
| HFo | 2.13 |
| $H_2O$ | 0.45 |

The liquid is heated in the vaporizer to about 115°–120° C., and the resulting vapors are allowed to flow through the catalyst in the tube to the condenser. The results of a typical run are as follows:

| Liquid-Feed Rate, ml./min. | Column Skin Temp., ° C. | Column Overhead Temp., C. * | Duration of Run, Hours | Percent HFo Removed |
|---|---|---|---|---|
| 1.2 | 175 | 120–140 | 0.75 | 92.7 |
| 1.2 | 175 | 120–140 | 1.5 | 94.4 |
| 1.2 | 175 | 120–140 | 2.2 | 97.6 |
| 1.2 | 175 | 120–140 | 6.0 | <67.6 |

*The overhead temperature is the vapor temperature taken as the vapors leave the catalyst bed and before they reach the condenser.

At the end of the run the catalyst has taken on the characteristic color of copper metal.

Example 3

The apparatus employed and the general procedure followed are essentially the same as in Example 2 with the exception that an inlet is provided for the introduction of oxygen (gaseous oxygen) to the catalytic zone concurrently with the introduction of the formic acid-containing vapors to the said zone. The results of a typical run are as follows:

| | |
|---|---|
| Liquid-feed rate, ml./min. | 1.2 |
| Oxygen-feed rate, ml./min. | 25 |
| Column skin temp., ° C. | 175 |
| Column overhead temp., ° C. | 120–140 |
| Duration of run, hrs. | 1.5 |
| Percent HFo removed | 97.4 |

Instead of proceeding as in Example 3 an oxidizer such as air or oxygen can be used to regenerate a spent or nearly spent catalyst. This is demonstrated by Example 4.

Example 4

The tube filled with the spent catalyst of Example 2 is flushed for 1 hour with gaseous oxygen while heating the tube to a temperature above 100° C. The catalyst regains its original light blue color, and its catalytic activity is restored as shown by the increase in HFo removal from <67.6 to 80.8. From this point on, oxygen or air is fed concurrently with the HFo-containing vapors as in Example 3 or Example 5.

Example 5

The apparatus employed and the procedure followed are the same as in Example 3 with the exception that air instead of oxygen is fed to the catalytic zone concurrently with the introduction of the formic acid-containing vapors to the said zone. The results of typical runs under varying conditions are as follows:

| Run | Liquid Feed rate, ml./min. | Air-Feed Rate, ml./min. | Column Skin Temp., °C. | Column Overhead Temp., °C. | Sampled during and after completion of run | |
|-----|---|---|---|---|---|---|
| | | | | | Duration of run, Hrs. | Percent HFo Removed |
| A | 1.2–1.8 | 25 | 175 | 120–145 | 4.5 | 93–95 |
| B | 1.2–1.8 | 50 | 175 | 130–140 | 2.5 | 95–98 |
| C | 2.5–3.0 | 50 | 175 | 155–175 | 1.0 | 87 |
| D | 1.2–1.8 | 50 | 200 | 140–155 | 3.33 | 99 |
| E | 1.2–1.8 | 50 | 150 | 135 | 1.0 | 89 |
| F | 2.5–3.0 | 200 | 200 | 165–185 | 3.0 | 97–99 |
| G | 2.5–3.0 | 200 | 165–175 | 170–175 | 2.0 | 94–96 |
| H | 2.0 | 200 | 175 | 140–170 | 4.5 | 98.7 |

Example 6

A catalyst is prepared as described in Example 1–B with the exception that activated silica is employed as the absorbent instead of activated alumina.

Example 7

Same as in Example 5 with the exception that the tube is packed with 210 g. of a catalyst prepared as in Example 6 and wherein the absorbent is activated silica instead of 153 g. of the catalyst of Example 1–B and wherein the absorbent is activated alumina. The results of a typical run are as follows:

Liquid feed rate, ml./min. _____ 2.5
Column skin temp., ° C. _____ 175
Column, overhead temp., ° C. _____ 120–140
Duration of run, hours _____ 3
Percent HFo removed _____ 92

Example 8

Same as in Example 5 except that 172 g. of a catalyst prepared as in Example 1–A, and wherein the absorbent is 8–14 mesh Alcoa F–1 grade activated alumina and the $Cu^{++}$ ion content thereof is about 0.5% of the alumina, is used instead of 153 g. of the catalyst of Example 1–B, and wherein the absorbent is ⅛-inch diameter spheres of Alcoa grade H–151 activated alumina containing about 1% of its weight of $Cu^{++}$ ion.

The results from an extended series of tests under varying conditions are as follows:

| Liquid Feed Rate, ml./min. | Air Feed Rate, m./min. | Bed Temp., °C. | Duration of Run, Hours | Percent HFo Removed |
|---|---|---|---|---|
| 2.0–3.0 | 150 | 220–230 | 270 | 92–98 |
| 3.7 | 150 | 220–230 | 7 | 94–96 |
| 3.0 | 150 | 225 | 12 | 97.6–98.6 |
| 1.8 | 150 | 250 | 1 | 99.5 |
| 1.8 | 150 | 225 | 1.5 | 99.5 |
| 1.8 | 150 | 200 | 1 | 99.0 |

Example 9

A catalyst is prepared as in Example 1–B with the exception that the salt used is $Cu_3(PO_4)_2 \cdot 3H_2O$ instead of $CuSO_4 \cdot 5H_2O$.

Example 10

Same as in Example 5 with the exception that the tube is packed with about 175 g. of the catalyst of Example 9. The conditions and results from a typical run are as follows:

Liquid feed rate, ml./min. _____ 2.8
Air feed rate, ml./min. _____ 150
Bed temperature, ° C. _____ 225
Duration of run, hours _____ 3
Percent HFo removed _____ 96

Example 11

A catalyst is prepared as in Example 1–A with the exception that the salt used is $CoSO_4$ instead of $CuSO_4$, the amount being adjusted to give 0.5%, by weight of the adsorbent, of $Co^{++}$ ion.

Example 12

Essentially the same procedure is followed as described in Example 5 with the exception that 170 g. of the catalyst of Example 11 is placed in the reactor. It is advantageous to feed air with heating for 15 minutes prior to the start of the HFo-containing feed. The conditions and results of a typical run are as follows:

Liquid feed rate, ml./min. _____ 2.5
Air feed rate, ml./min. _____ 150
Bed temperature, ° C. _____ 225
Duration of run, hours _____ 2
Percent HFo removed _____ 93

Example 13

Same as in Example 1–A with the exception that the salt used is $NiSO_4$ instead of $CuSO_4$.

Example 14

Same as in Example 12 with the exception that 175 g. of the catalyst of Example 13 is used in the reactor. The results and conditions of a typical run are as follows:

Liquid feed rate, ml./min. _____ 3.0
Air feed rate, ml./min. _____ 175
Bed temperature, ° C. _____ 225
Duration of run, hours _____ 3
Percent HFo removed _____ 94

The following example illustrates the results obtained using different grades of untreated alumina and of alumina which has been treated with different amounts of copper sulfate.

Example 15

The catalyst to be tested is placed in a glass tube, having an inside diameter of ¾-inch, to a height of 24 inches. The tube is wound with heating wire over its whole length, and a thermometer is inserted into the top of the catalyst bed for overhead measurements. The HFo-containing material, which has approximately the same composition as that used in Example 2 (approximately 2.1% HFo), is vaporized and passed upwardly through the catalyst bed together with a stream of air. The liquid feed rate is 1.8 ml./min. and the air feed rate is 150 ml./min. The percent HFo decomposed at various bed temperatures is noted.

The untreated catalysts employed are F–1 and F–3 grades of Alcoa activated alumina (8–14 mesh size) and Alcoa H–151 grade of activated alumina in the form of ⅛-inch diameter spheres. The treated aluminas (i.e., a catalyst of this invention) are the aforementioned F–1 and F–3 grades of Alcoa aluminas treated so that they contain approximately 0.5 weight percent $Cu^{++}$ ion introduced in the form of copper sulfate pentahydrate, whereas the Alcoa H–151 grade is similarly prepared to contain approximately 1% $Cu^{++}$ ion.

The results of these tests are shown in the following table:

PERCENT HFo REMOVED BY DIFFERENT CATALYSTS

| Bed Temperature, °C. | H–151 | H–151 plus 1% $Cu^{++}$ ion | F–1 | F–1 plus 0.5% $Cu^{++}$ ion | F–3 | F–3 plus 0.5% $Cu^{++}$ ion |
|---|---|---|---|---|---|---|
| 250 | 78 | 98.6 | 97.6 | 99.5 | 95 | 99.8 |
| 225 | 49 | 93 | 69 | 99.5 | 89 | 99.8 |
| 200 | ------ | 80 | 49 | 99.0 | 42 | 98.6 |

From the data in the foregoing table it will be noted that the F-1 and F-3 alumina-copper catalysts are superior in HFo removal to the H-151 alumina-copper catalyst at corresponding temperatures. In all cases the blanks (i.e., the untreated aluminas) are inferior to the corresponding copper-containing catalysts.

It will be understood, of course, by those skilled in the art that the present invention is not limited only to the preparation of the particular catalysts and using them only in the particular way shown in the foregoing examples by way of illustration. Thus, instead of using activated alumina or activated silica as the adsorbent, as shown in some of the specific examples, one may use other natural or synthetically prepared alumina-containing and/or silica-containing adsorbents such as, for instance, bauxite, fuller's earth and the like; or one may use adsorbent forms of thoria or titania; or adsorbents such as activated carbon, activated charcoal, bone-black and others derived from carbonaceous materials.

An outstanding advantage of the present invention is that it provides economical means for increasing process efficiencies or production rates. For example, in the production of acetic anhydride from a feed stream containing both formic and acetic acids, it provides means for increasing acetic anhydride production by about 8% while holding the same efficiency obtained by the prior practice of removing formic acid from the acetic acid feed stream; or, alternatively, it provides means for increasing the acetic acid efficiency by about 2% while holding the same production rate secured by the previous technique for treating the feed stream containing formic and acetic acids in order to remove formic acid therefrom.

It is to be understood that the foregoing detailed description is given merely by way of illustration and not by way of limitation and that many variations may be made therein without departing from the spirit of the invention.

The novel features of the invention to which an exclusive property or privilege is claimed are as follows:

1. The method of selectively removing formic acid from a mixture obtained in a process for oxidizing hydrocarbons containing formic acid and other vaporizable organic compounds, including acetic acid, which comprises bringing said mixture, in vapor form, together with from about 5 to 300 ml. per minute for each ml. per minute of said mixture, of an oxidizing oxygen-containing gas comprising oxygen, air, or gaseous oxides of nitrogen, into contact with a catalyst comprising an adsorbent having on its surfaces an inherently acidic salt of a weak inorganic base and a strong acid, the cation of said base being selected from the group consisting of copper, iron, cobalt, nickel, iridium, palladium and platinum, the amount of said salt on the surfaces of said adsorbent being at least about 0.05% by weight, calculated on the basis of said cation, of the weight of said adsorbent, whereby formic acid in said mixture is selectively decomposed.

2. The method as in claim 1 wherein said formic acid-containing mixture also contains water.

3. The method as in claim 1 wherein said adsorbent is an inorganic adsorbent.

4. The method as in claim 1 wherein said adsorbent is activated silica.

5. The method as in claim 1 wherein said adsorbent is activated alumina.

6. The method as in claim 1 wherein said salt is a cupric salt of a strong acid.

7. The method as in claim 1 wherein said salt is a cobalt salt of a strong acid.

8. The method as in claim 1 wherein said salt is a nickel salt of a strong acid.

9. The method as in claim 1 wherein said salt is copper sulfate.

10. The method as in claim 1 wherein said salt is cobalt sulfate.

11. The method as in claim 1 wherein said salt is nickel sulfate.

12. The method as in claim 1 wherein said oxidizing oxygen-containing gas is a gas comprising molecular oxygen.

13. The method as in claim 1 wherein said oxidizing oxygen-containing gas is air.

14. The method of selectively removing formic acid from a mixture obtained in a process for oxidizing hydrocarbons containing formic acid and other vaporizable compounds including acetic acid, the latter being the major constituent of said mixture, which method comprises vaporizing said mixture, passing the thus-obtained vaporized mixture concurrently with from about 5 to 300 ml. per minute for each ml. per minute of said vaporized mixture, of a gas comprising molecular oxygen through a catalytic zone in contact, at a bed temperature not exceeding about 250° C., with a catalyst comprising an inorganic adsorbent having on its surfaces an inherently acidic salt of a weak inorganic base and sulfuric acid, the cation of said base being selected from the group consisting of copper, iron, cobalt, nickel, iridium, palladium and platinum, the amount of said salt on the surfaces of said adsorbent being from about 0.1% to about 10% by weight, calculated on the basis of said cation, of the weight of said adsorbent, whereby formic acid in said vaporized mixture is selectively decomposed.

15. The method as in claim 14 wherein said salt is copper sulfate.

16. The method as in claim 14 wherein said adsorbent is activated alumina and said salt is copper sulfate.

References Cited

UNITED STATES PATENTS

| | | | |
|---|---|---|---|
| 2,496,621 | 2/1950 | Deery | 252—437 |
| 2,656,379 | 10/1953 | MacKenzie et al. | 260—541 |
| 2,732,329 | 1/1956 | Doumani | 252—440 |
| 3,190,912 | 6/1965 | Robinson | 260—497 |
| 3,221,045 | 11/1965 | McKeon et al. | 260—497 |

FOREIGN PATENTS

| | | |
|---|---|---|
| 614,970 | 9/1962 | Belgium. |
| 643,862 | 9/1950 | Great Britain. |
| 855,751 | 12/1960 | Great Britain. |

OTHER REFERENCES

Chemical Abstracts 44:4411d (1950).

Eley et al., Advances in Catalysis, Academic Press, 1963, pp. 84 and 96–102.

LORRAINE A. WEINBERGER, *Primary Examiner.*

V. GARNER, *Assistant Examiner.*